(12) United States Patent
Morikawa et al.

(10) Patent No.: US 7,191,201 B2
(45) Date of Patent: Mar. 13, 2007

(54) ARITHMETIC PROCESSING APPARATUS

(75) Inventors: Makoto Morikawa, Tokyo (JP);
Atsushi Katsumata, Tokyo (JP); Koji Kobayashi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 675 days.

(21) Appl. No.: 10/421,125

(22) Filed: Aug. 4, 2003

(65) Prior Publication Data
US 2004/0019621 A1 Jan. 29, 2004

(30) Foreign Application Priority Data
Apr. 24, 2002 (JP) ............................. 2002/122293

(51) Int. Cl.
*G06F 7/38* (2006.01)
*G06F 17/14* (2006.01)
(52) U.S. Cl. ...................................... 708/401; 708/490
(58) Field of Classification Search ................ 708/400, 708/401, 308
See application file for complete search history.

(56) References Cited

U.S. PATENT DOCUMENTS 5,046,023 A * 9/1991 Katsura et al. ............. 345/619
5,537,601 A * 7/1996 Kimura et al. ................ 712/35
5,583,803 A * 12/1996 Matsumoto et al. ........ 708/401

FOREIGN PATENT DOCUMENTS

JP 2000-222384 A 8/2000
JP 2001-022731 A 1/2001
JP 2001-244974 A 9/2001

OTHER PUBLICATIONS

Morikawa et al., "Development of Image Processing LSI based on Phase Only Correlation", Technical Report of IEICE, pp. 53-59 (Oct. 2001).
Morikawa et al., "An Image Processor Implementing Algorithms using Characteristics of Phase Spectrum of Two-Dimentional Fourier Transformation", Proceedings of the IEEE International Symposium on Industrial Electronics, Jul. 1999.

* cited by examiner

*Primary Examiner*—Chuong D. Ngo
(74) *Attorney, Agent, or Firm*—Blakely Sokoloff Taylor & Zafman

(57) ABSTRACT

An arithmetic processing apparatus includes a first data storage unit, two-dimensional arithmetic unit, and main control unit. The first data storage unit stores data to be processed. The two-dimensional arithmetic unit performs two-dimensional operation. The main control unit controls the two-dimensional arithmetic unit. The two-dimensional arithmetic unit includes an input address calculation unit which calculates the addresses of a set of input data necessary for a designated type of operation in the first data storage unit in accordance with an execution start instruction which designates the type of operation and a parameter from the main control unit, and an arithmetic execution unit which performs the designated type of operation for the set of input data which are stored at the calculated addresses in the first data storage unit.

7 Claims, 8 Drawing Sheets

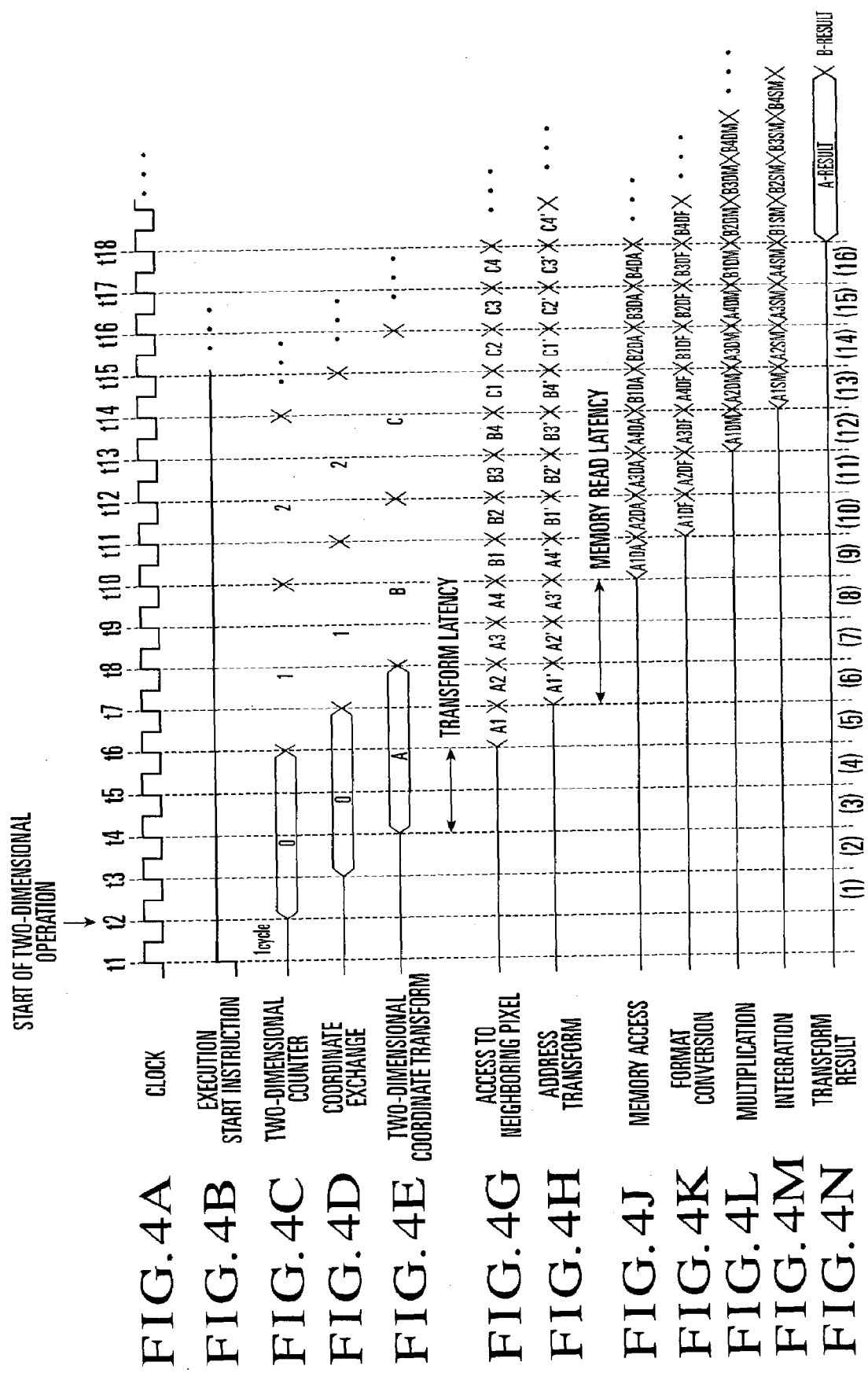

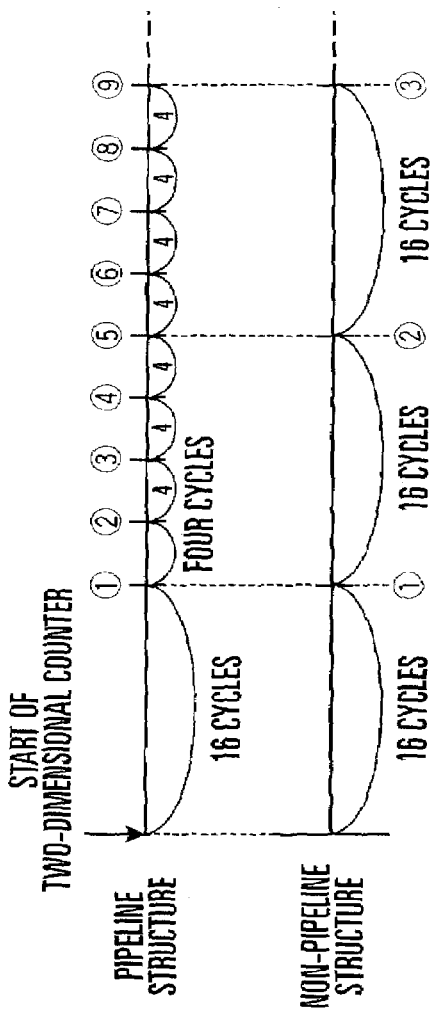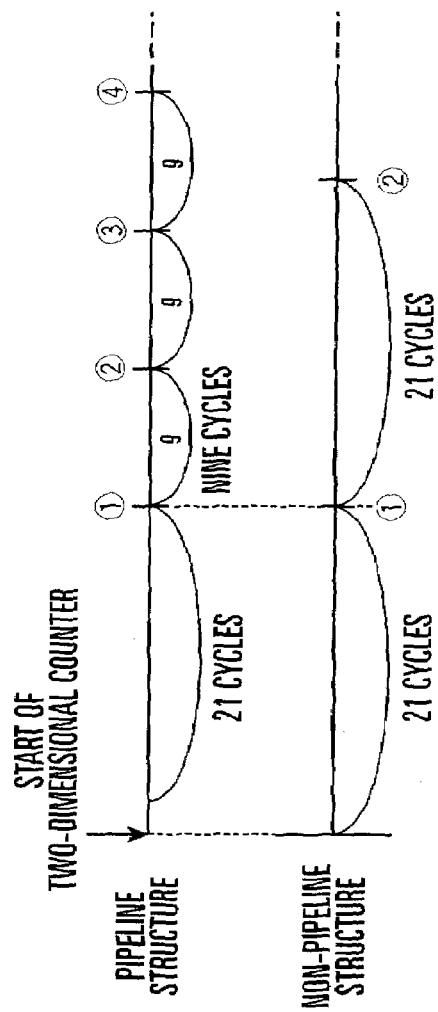

ARITHMETIC PROCESSING APPARATUS

BACKGROUND OF THE INVENTION

The present invention relates to an arithmetic processing apparatus which is preferably used in image processing and the like.

An image processing apparatus which has been developed by the present applicant executes two-dimensional operation (affine transform, polar coordinate transform, spatial filtering, and the like) of performing arithmetic processing of outputting one data (one pixel) as a result of two-dimensional spatial data (a plurality of input data), and main operation which is the core of image processing such as FFT (Fast Fourier Transform) and DCT (Discrete Cosine Transform). In two-dimensional operation such as affine transform, arithmetic processing of outputting one data (one pixel) as a result of two-dimensional spatial data (a plurality of input data) is executed.

Affine transform is to perform geometrical transform such as moving, rotation, enlargement, and reduction for image data (pixel). For example, in pattern matching, matching is difficult in the presence of a positional shift, rotational shift, or scaling difference (enlargement/reduction) between a registered pattern and a matching pattern. To remove the positional shift, rotational shift, or scaling difference, image data is geometrically operated for either of the registered and matching patterns.

In an arithmetic processing apparatus which has been proposed by the present applicant and is disclosed in Japanese Patent Laid-Open No. 2000-222384, a main arithmetic unit sequentially receives instructions from a main controller before main operation, and executes two-dimensional operation such as affine transform, polar coordinate transform, or spatial filtering by software. According to this method, two-dimensional operation starts upon sequential reception of instructions from the main controller. This takes a long time, failing to increase the speed.

To prevent this, it is considered to separate two-dimensional operation from the main arithmetic unit and arrange a dedicated two-dimensional arithmetic unit as hardware on the input stage of the main arithmetic unit. FIG. 9 shows the main part of this image processing apparatus. In FIG. 9, reference numeral 1 denotes a data storage which stores many image data to be processed; 2, a two-dimensional arithmetic unit which performs two-dimensional operation such as affine transform, polar coordinate transform, or spatial filtering; 3, a main arithmetic unit which performs main operation such as FFT or DCT; and 4, a switch. In the image processing apparatus, the main arithmetic unit 3 executes, e.g., FFT processing. The two-dimensional arithmetic unit 2 comprises an affine transform unit 2-1 which performs affine transform, a polar coordinate transform unit 2-2 which performs polar coordinate transform, and a spatial filtering unit 2-N which performs spatial filtering.

To perform affine transform before FFT processing in the image processing apparatus, the switch 4 is switched to the affine transform unit 2-1. Image data is then read out from the data storage 1, subjected to affine transform by the affine transform unit 2-1, and returned to the data storage 1. The image data which has been returned to the data storage 1 is sent to the main arithmetic unit 3, subjected to FFT processing, and returned to the data storage 1. Similarly, to perform polar coordinate transform before FFT processing, the switch 4 is switched to the polar coordinate transform unit 2-2. To perform spatial filtering before FFT processing, the switch 4 is switched to the spatial filtering unit 2-N.

In this image processing apparatus, the two-dimensional arithmetic unit 2 must be equipped with processors by the number of types of necessary processes, resulting in a large circuit scale.

SUMMARY OF THE INVENTION

It is an object of the present invention to provide an arithmetic processing apparatus capable of reducing the circuit scale.

To achieve the above object, according to the present invention, there is provided an arithmetic processing apparatus comprising first data storage means for storing data to be processed, two-dimensional arithmetic means for performing two-dimensional operation, and main control means for controlling the two-dimensional arithmetic means, wherein the two-dimensional arithmetic means comprises input address calculation means for calculating addresses of a set of input data necessary for a designated type of operation in the first data storage means in accordance with an execution start instruction which designates the type of operation and a parameter from the main control means, and arithmetic execution means for performing the designated type of operation for the set of input data which are stored at the calculated addresses in the first data storage means.

BRIEF DESCRIPTION OF THE DRAWINGS

FIGS. 4A–4E, 4G, 4H, and 4J–4N are timing charts showing processing steps in the two-dimensional arithmetic unit;

FIGS. 5A and 5B are views showing a comparison between a pipeline structure and a non-pipeline structure in the output timing of an affine transform result from the two-dimensional arithmetic unit;

FIGS. 6A and 6B are views showing a comparison between the pipeline structure and the non-pipeline structure in the output timing of a processing result when the two-dimensional arithmetic unit functions as a spatial filter;

DESCRIPTION OF THE PREFERRED EMBODIMENT

Figure 1:
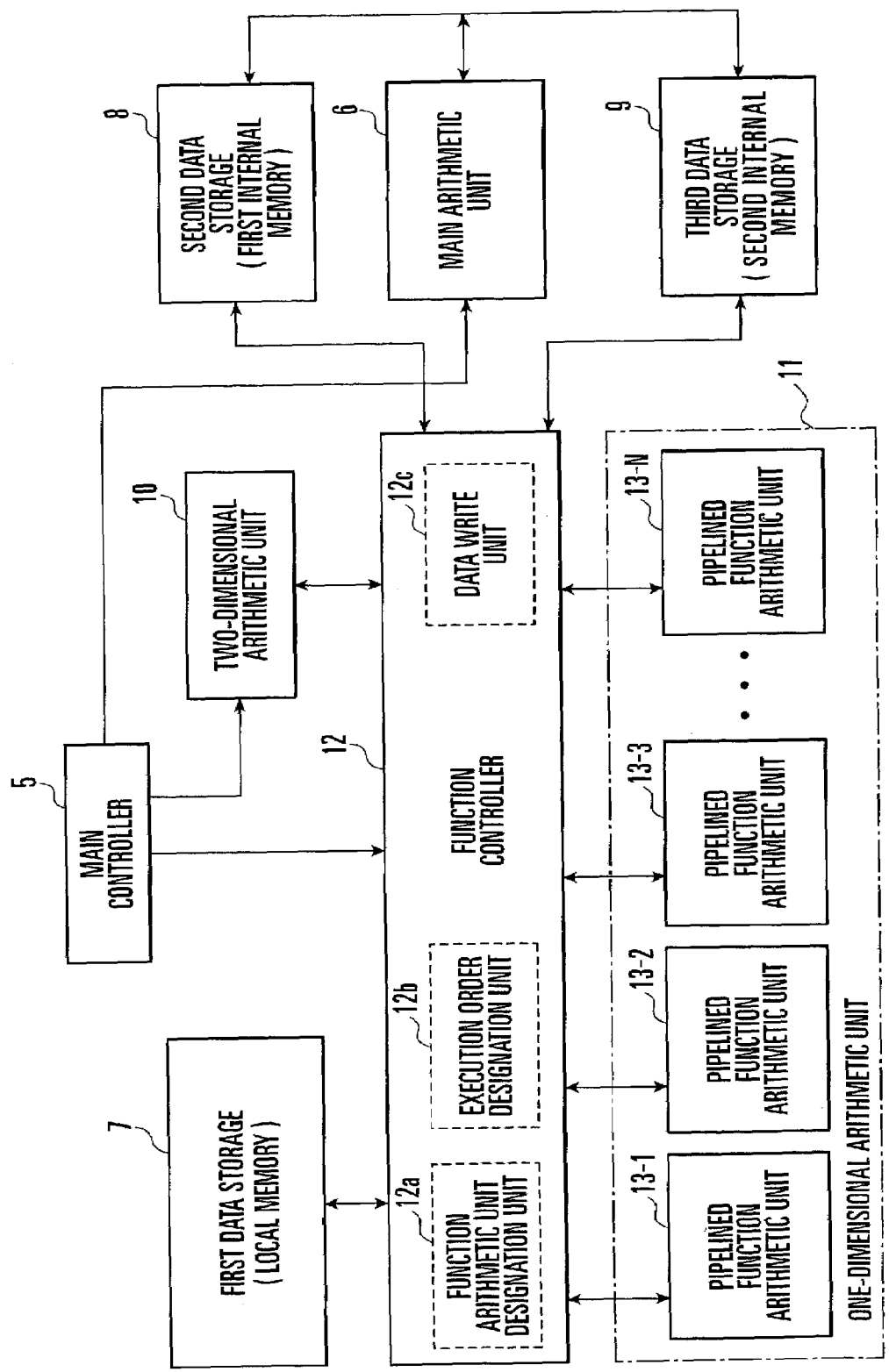
FIG. 1 is a block diagram showing the main part of an arithmetic processing apparatus according to an embodiment of the present invention.

The present invention will be described in detail below with reference to the accompanying drawings. FIG. 1 shows the main part of an arithmetic processing apparatus according to an embodiment of the present invention. In FIG. 1, reference numeral 5 denotes a main controller; 6, a main arithmetic unit which performs, e.g., FFT processing; 7, a first data storage (to be referred to as a local memory hereinafter); 8, a second data storage (to be referred to as a first internal memory hereinafter); 9, a third data storage (to be referred to as a second internal memory hereinafter); 10, a two-dimensional arithmetic unit; 11, a one-dimensional arithmetic unit; and 12, a function controller.

The local memory 7 stores many image data to be processed. The local memory 7 permits a standby time in short-term operation switching between, e.g., data read and write, and can exploit a low-cost, large-capacity memory. The first and second internal memories 8 and 9 adopt high-performance, small-capacity memories which are almost free from any standby time in short-term operation switching between, e.g., data read and write.

The main arithmetic unit 6 can access not the large-capacity local memory 7 but the small-capacity internal memories 8 and 9. The main arithmetic unit 6 alternately reads out data to be processed from the first and second internal memories 8 and 9 under the control of the main controller 5. The main arithmetic unit 6 executes main operation, e.g., FFT processing for each read data, and writes arithmetic result data in the original internal memory from which the processed data has been read out.

The one-dimensional arithmetic unit 11 is comprised of 1-input 1-output pipelined function arithmetic units 13-1 to 13-N which perform predetermined operation for one input data (one pixel). The function controller 12 is interposed between the main controller 5 and the pipelined function arithmetic units 13-1 to 13-N. The main controller 5 designates a pipelined function arithmetic unit (pipelined function arithmetic group) to be executed, and designates the execution order for arithmetic processing of the one-dimensional arithmetic unit 11.

The function controller 12 is basically comprised of a multiplexer. The function controller 12 also comprises a function arithmetic unit designation unit 12a, execution order designation unit 12b, and data write unit 12c. The function arithmetic unit designation unit 12a designates pipelined function arithmetic units which are selected by the main controller 5 from the pipelined function arithmetic group of the one-dimensional arithmetic unit 11. The execution order designation unit 12b cascade-connects the pipelined function arithmetic units designated by the function arithmetic unit designation unit 12a in accordance with the execution order, and transfers data processed by the pipelined function arithmetic units.

While the main arithmetic unit 6 performs FFT processing by inputting/outputting data to/from the first internal memory 8, the data write unit 12c writes in the local memory 7 data obtained by performing arithmetic processing (post-processing) by the one-dimensional arithmetic unit 11 for arithmetic result data of the main arithmetic unit 6 that is written in the second internal memory 9. In addition, the data write unit 12c writes in the second internal memory 9 data obtained by performing arithmetic processing (second pre-processing) by the one-dimensional arithmetic unit 11 for arithmetic result data (data having undergone the first pre-processing) from the two-dimensional arithmetic unit 10.

While the main arithmetic unit 6 performs FFT processing by inputting/outputting data to/from the second internal memory 9, the function controller 12 writes in the local memory 7 data obtained by performing arithmetic processing (post-processing) by the one-dimensional arithmetic unit 11 for arithmetic result data of the main arithmetic unit 6 that is written in the first internal memory 8. Further, the function controller 12 writes in the first internal memory 8 data obtained by performing arithmetic processing (second pre-processing) by the one-dimensional arithmetic unit 11 for arithmetic result data (data having undergone the first pre-processing) from the two-dimensional arithmetic unit 10.

This processing can eliminate the main arithmetic time in appearance.

The pipelined function arithmetic units 13-1 to 13-N can start arithmetic processing of newly input data before the end of arithmetic processing (e.g., one-dimensional operation such as addition, subtraction, multiplication, shift, or logical operation) of input data during operation. Even if the first data to be processed is input but its arithmetic processing result is not output yet (time necessary for functional operation of one data has not elapsed yet), the second data to be processed can be input in the next cycle. The pipelined function arithmetic unit 13 has an interface which outputs a handshaking signal so as to transfer data to the next function upon the completion of operation using a given function.

Figure 2:
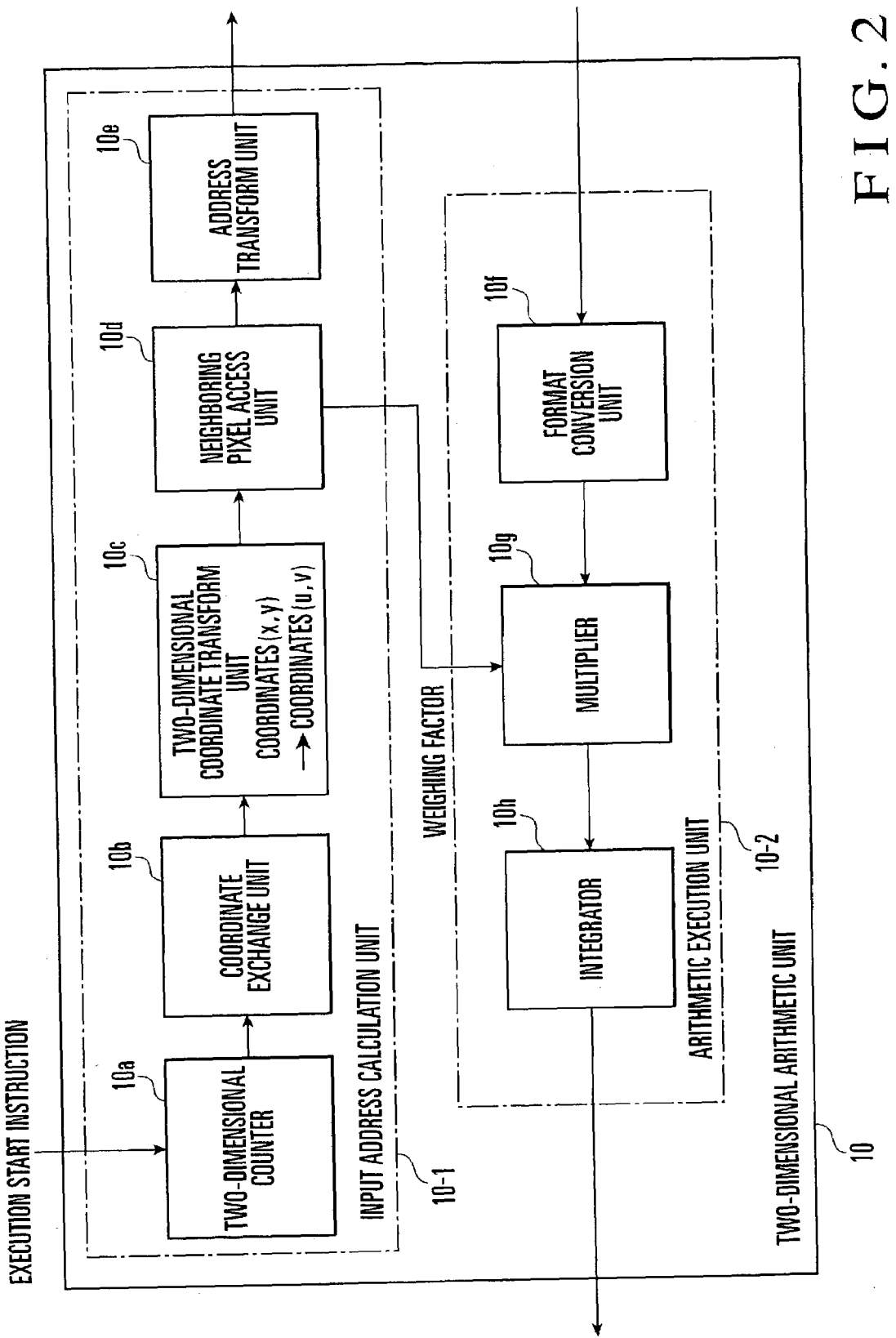
FIG. 2 is a block diagram showing the schematic internal arrangement of a two-dimensional arithmetic unit used in the arithmetic processing apparatus.

As shown in FIG. 2, the two-dimensional arithmetic unit 10 comprises an input address calculation unit 10-1 and arithmetic execution unit 10-2. In accordance with an execution start instruction which is input from the main controller 5 and designates the type of operation and parameters, the input address calculation unit 10-1 calculates addresses in the local memory 7 for a set of input data necessary for the type of operation designated by the execution start instruction. The arithmetic execution unit 10-2 reads out, as a set of input data via the function controller 12, data which are stored in the local memory 7 at the addresses calculated by the input address calculation unit 10-1. The arithmetic execution unit 10-2 executes the designated type of operation for the readout set of input data.

For example, if the main controller 5 designates affine transform as the type of operation and its parameters (e.g., an arithmetic function parameter, the number of data which constitute a set of input data, and the positional relationship between input data in the two-dimensional space), the two-dimensional arithmetic unit 10 functions as an affine transform unit and executes affine transform for a set of input data read out from the data storage.

If the main controller 5 designates polar coordinate transform as the type of operation and its parameters (e.g., an arithmetic function parameter, the number of data which constitute a set of input data, and the positional relationship between input data in the two-dimensional space), the two-dimensional arithmetic unit 10 functions as a polar coordinate transform unit and executes polar coordinate transform for a set of input data read out from the data storage.

In this manner, according to the present invention, one two-dimensional arithmetic unit 10 functions as various two-dimensional arithmetic units 10 such as an affine transform unit, polar coordinate transform unit, and spatial filtering unit in accordance with designation of the type of operation and parameters from the main controller 5. Processing of calculating the addresses of a necessary set of input data in the data storage, processing of reading out, as a set of input data, data which are stored at the calculated addresses in the data storage, and basic arithmetic processes such as multiplication and accumulation in a designated type of operation for the readout set of input data are common to various two-dimensional operations. That is, the two-dimensional arithmetic unit of the present invention includes an arrangement common to various two-dimensional operations and dedicated arrangements.

In the present invention, when the two-dimensional arithmetic unit 10 receives from the main controller 5 an execution start instruction which designates the type of operation and parameters, the two-dimensional arithmetic unit 10 calculates the addresses of a set of input data necessary for the designated type of operation in the first data storage 7. The two-dimensional arithmetic unit 10 reads out, as a set of input data, data which are stored at the calculated addresses in the local memory 7, and performs the designated type of operation for the readout set of input data.

In other words, one two-dimensional arithmetic unit 10 changes to various two-dimensional arithmetic units such as an affine transform unit, polar coordinate transform unit, and spatial filtering unit in accordance with designation of the type of operation and parameters from the main controller 5. The two-dimensional arithmetic unit 10 includes an arrangement common to various two-dimensional operations and dedicated arrangements.

The two-dimensional arithmetic unit 10 has a pipeline structure capable of starting arithmetic processing of a new set of input data before the end of arithmetic processing of a preceding set of input data.

FIG. 2 schematically shows the internal arrangement of the two-dimensional arithmetic unit 10. As described above, the two-dimensional arithmetic unit 10 comprises the input address calculation unit 10-1 and arithmetic execution unit 10-2. The input address calculation unit 10-1 has a two-dimensional counter 10a, coordinate exchange unit 10b, two-dimensional coordinate transform unit 10c, neighboring pixel access unit 10d, and address transform unit 10e. The arithmetic execution unit 10-2 has a format conversion unit 10f, multiplier 10g, and integrator 10h. The coordinate exchange unit 10b and two-dimensional coordinate transform unit 10c are arranged for each two-dimensional operation. A plurality of types of two-dimensional operations may be adopted. In this case, one of a plurality of types of two-dimensional operations is selectively executed in accordance with designation from the main controller 5. The function of each unit in the two-dimensional arithmetic unit 10 will be described later.

The image processing apparatus performs FFT processing as follows.

Before the main arithmetic unit 6 executes FFT processing, the main controller 5 cause the two-dimensional arithmetic unit 10 and one-dimensional arithmetic unit 11 to perform pre-processing for data which is stored in the local memory 7 and subjected to processing. In this case, the main controller 5 first causes the two-dimensional arithmetic unit 10 to perform the first pre-processing (two-dimensional operation), and then causes the one-dimensional arithmetic unit 11 to perform the second pre-processing (one-dimensional operation).

[First Pre-Processing: Two-Dimensional Operation]

The main controller 5 inputs to the two-dimensional arithmetic unit 10 an execution start instruction which designates the type of operation and parameters. For example, an arithmetic function parameter, the number of (e.g., four) data which constitute a set of input data, and the positional relationship between input data in the two-dimensional space are designated and input as parameters when affine transform is designated as the type of operation.

The first pre-processing will be described by exemplifying affine transform as two-dimensional calculation in the two-dimensional arithmetic unit 10.

Image data includes pixel values (pixel data: density and brightness) at a predetermined interval and data (addresses) of the pixels in the two-dimensional space.

If a point which shifts to a pixel address in the two-dimensional space after transform corresponds to any pixel address before transform by affine transform, the corresponding pixel value before transform can be inherited as a pixel value after transform. If no corresponding pixel address exists, however, the point is positioned between pixels before transform. The values of four pixels around the position are weighted in accordance with their distances, and the sum of the weighted values is used as a pixel value after transform. This method is called interpolation, and a method of obtaining an address value between pixels is called complementation. Interpolation is employed not only for affine transform but also for polar coordinate transform and the like.

Figures 3A, 3B:
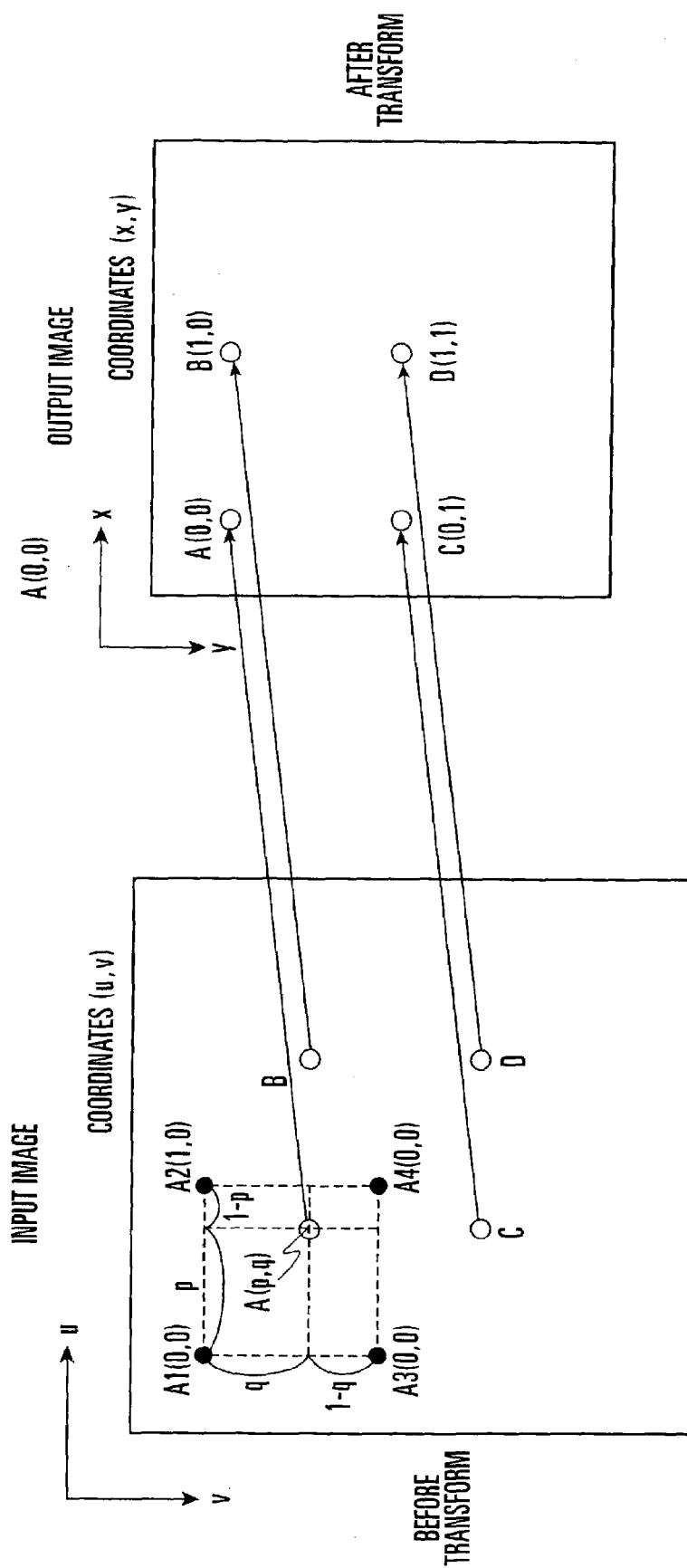
FIGS. 3A and 3B are views for explaining an example of affine transform using interpolation.

FIGS. 3A and 3B show an example of affine transform using interpolation. FIG. 3A shows an input image before transform, and FIG. 3B shows an output image after transform. The input image is expressed by coordinates (u,v), and the output image is expressed by coordinates (x,y). As a simple example, the input image is translated into an output image by affine transform.

In this example, coordinates (0,0) of point A in the output image correspond to coordinates (p,q) of point A in the input image. However, there is no pixel data corresponding to point A (p,q) in the input image. In this case, the sum of values obtained by weighting the pixel values of four neighboring pixels (A1, A2, A3, and A4) in accordance with the distances from point A (p,q) is calculated as the pixel value of point A (0,0) in the output image. Letting A be the pixel value of point A (0,0) in the output image, and A1, A2, A3, and A4 be the pixel values of points A1, A2, A3, and A4 in the input image, the pixel value A of point A (0,0) in the output image is calculated by $$A = A1 \cdot (1-p) \cdot (1-q) + A2 \cdot p \cdot (1-q) + A3 \cdot (1-p) \cdot A4 \cdot p \cdot q \qquad (1)$$

FIGS. 4A–4E, 4G, 4H, and 4J–4N show the timing charts of processing steps in the two-dimensional arithmetic unit 10. FIG. 4A shows a clock signal. Processing in each step proceeds in synchronism with the clock signal. If the main controller 5 inputs an execution start instruction which designates the type of operation and parameters (point t1 in FIG. 4B), the operation of the two-dimensional counter 10a start after one cycle in order to set the designated type of operation (point t2 in FIG. 4C). At this time, affine transform substantially starts.

The two-dimensional counter 10a increments the count value every time it counts four cycles. The coordinate exchange unit 10b exchanges coordinates one cycle after the start of the operation of the two-dimensional counter 10a (point t3 in FIG. 4D). Coordinate exchange is assigned one cycle.

After coordinate exchange, the two-dimensional coordinate transform unit 10c executes two-dimensional coordinate transform (point t4 in FIG. 4E). Even if the coordinate exchange unit 10b does not perform coordinate exchange, the two-dimensional coordinate transform unit 10c executes two-dimensional coordinate transform one cycle after point t3. As a result of two-dimensional coordinate transform by the two-dimensional coordinate transform unit 10c, coordinates (0,0) of point A in the output image serving as the coordinates of the first reference pixel are transformed into coordinates (p,q) of point A in the input image.

As for counting by the two-dimensional counter 10a, coordinate exchange by the coordinate exchange unit 10b, and two-dimensional coordinate transform by the two-dimensional coordinate transform unit 10c, a time of four cycles is ensured for each reference pixel. Since two-dimensional coordinate transform takes two cycles for operation, the neighboring pixel access unit 10d accesses neighboring pixels after two cycles (point t6 in FIG. 4G). One neighboring pixel is accessed in one cycle. Accordingly, the coordinates of pixels A1, A2, A3, and A4 around coordinates (p,q) of point A in the input image are obtained in respective cycles (points t6, t7, t8, and t9 in FIG. 4G).

The address transform unit 10e transforms the coordinates of neighboring pixels A1, A2, A3, and A4 from the neighboring pixel access unit 10d into addresses A1', A2', A3', and A4' in the local memory 7 that correspond to the coordinates (points t7, t8, t9, and t10 in FIG. 4H). In other words, the addresses in two-dimensional expression are transformed into a one-dimensional address space.

In this manner, addresses A1', A2', A3', and A4' in the local memory 7 are obtained for pixels A1, A2, A3, and A4 around coordinates (p,q) of point A in the input image. After that, the two-dimensional arithmetic unit 10 accesses the local memory 7 via the function controller 12, and reads out pixel data A1DA, A2DA, A3DA, and A4DA stored at addresses A1', A2', A3', and A4' as a set of input data necessary for affine transform (points t10, t11, t12, and t13 in FIG. 4J).

In this example, pixel data A1DA, A2DA, A3DA, and A4DA are read out every time the 3-cycle read latency elapses after addresses A1', A2', A3', and A4' are obtained. The read latency is decided by the characteristic of the local memory 7, and is not directly related to two-dimensional operation.

Pixel data A1DA, A2DA, A3DA, and A4DA read out from the local memory 7 are input to the format conversion unit 10f where the data undergo format conversion of adjusting the memory bit width to the arithmetic bit width. Format-converted pixel data A1DF, A2DF, A3DF, and A4DF are obtained bit by bit with a delay (points t11, t12, t13, and t14 in FIG. 4K).

The format conversion unit 10f sends format-converted pixel data A1DF, A2DF, A3DF, and A4DF to the multiplier 10g. The multiplier 10g weights pixel data A1DF, A2DF, A3DF, and A4DF by using, as weighting factors, p and q of coordinates (p,q) of point A in the input image that are obtained by the neighboring pixel access unit 10d.

In this case, product A1DM is calculated by multiplying pixel data A1DF by (1−p)·(1−q) in accordance with equation (1). Product A2DM is calculated by multiplying pixel data A2DF by p·(1−q). Product A3DM is calculated by multiplying pixel data A3DF by (1−p) q. Product A4DM is calculated by multiplying pixel data A4DF by p·q. Since multiplication takes two cycles, products A1DM, A2DM, A3DM, and A4DM are obtained two cycles after format transform (points t13, t14, t15, and t16 in FIG. 4L).

The multiplier 10g inputs products A1DM, A2DM, A3DM, and A4DM to the integrator 10h. The integrator 10h adds products ALDM, A2DM, A3DM, and A4DM into A1SM, A2SM, A3SM, and A4SM (t14, t15, t16, and t17 in FIG. 4M). After cycles (in this case, four cycles) corresponding to the number of data which constitute a set of input data, A-RESULT is obtained as a final affine transform result (t18 in FIG. 4N). It takes 16 cycles to obtain A-RESULT after the start of affine transform.

The two-dimensional arithmetic unit 10 has a pipeline structure capable of starting arithmetic processing of a new set of input data before the end of arithmetic processing of a preceding set of input data. With this pipeline structure, the two-dimensional arithmetic unit 10 starts the next affine transform not after A-RESULT is obtained as an affine transform result, i.e., 16 cycles have elapsed upon the start of affine transform, but every time the count value of the two-dimensional counter 10a is incremented (every time four cycles elapse).

As shown in FIG. 5A, A-RESULT (affine transform result ①) at coordinates (0,0) of point A serving as the first reference pixel is obtained 16 cycles after the start of affine transform. After A-RESULT is obtained, B-RESULT (affine transform result ②) at coordinates (1,0) of point B serving as the second reference pixel is obtained after four cycles. Similarly, affine transform results at the coordinates of respective reference pixels are obtained every time four cycles elapse.

FIG. 5B shows a state wherein an affine transform result is obtained when the two-dimensional arithmetic unit 10 does not have any pipeline structure. The time taken to obtain the first affine transform result after the start of affine transform without the use of the pipeline structure is the same as that with the use of the pipeline structure. The second and subsequent affine transform results are obtained every four cycles with the pipeline structure, but every 16 cycles without any pipeline structure. The pipeline structure greatly increases the processing speed of the two-dimensional arithmetic unit 10.

In the above-described example, the two-dimensional arithmetic unit 10 performs affine transform as the first pre-processing. The two-dimensional arithmetic unit 10 can also be caused to perform polar coordinate transform or function as a spatial filter by inputting to the two-dimensional arithmetic unit 10 an execution start instruction which designates the type of operation and parameters. In this embodiment, one two-dimensional arithmetic unit 10 changes to various two-dimensional arithmetic units such as an affine transform unit, polar coordinate transform unit, and spatial filtering unit in accordance with designation of the type of operation and parameters from the main controller 5.

Processing of calculating the addresses of a necessary set of input data in the memory, processing of reading out, as a set of input data, data which are stored at the calculated addresses in the memory, and arithmetic processes such as multiplication and accumulation in a designated type of operation for the readout set of input data are common to various two-dimensional operations. That is, in the two-dimensional arithmetic unit 10, the neighboring pixel access unit 10d, address transform unit 10e, format conversion unit 10f, multiplier 10g, and integrator 10h are common to various two-dimensional operations. To the contrary, a dedicated coordinate exchange unit 10b and two-dimensional coordinate transform unit 10c are selected in accordance with the type of operation designated by the main controller 5. In this fashion, the two-dimensional arithmetic unit 10 includes an arrangement common to various two-dimensional operations and dedicated arrangements. The common part occupies a large area, reducing the circuit scale in comparison with an arrangement in which two-dimensional arithmetic units are arranged by necessary types of operations.

FIG. 6A shows as a reference a state in which a processing result is obtained when the two-dimensional arithmetic unit 10 functions as a spatial filter. When the two-dimensional arithmetic unit 10 functions as a spatial filter, the number of data in one set is nine. Spatial filtering result ① at the coordinates of the first reference pixel is obtained after 21 cycles. A spatial filtering result at the coordinates of the second reference pixel is obtained nine cycles after spatial filtering result ① is obtained. Similarly, a spatial filtering result at the coordinates of each succeeding reference pixel is obtained every nine cycles. If the two-dimensional arithmetic unit 10 does not have any pipeline structure, each spatial filtering result is obtained every 21 cycles, as shown in FIG. 6B, decreasing the processing speed.

[Second Pre-Processing: One-Dimensional Operation]

Prior to FFT processing, the main controller 5 causes the function controller 12 to select, as the first pipelined function arithmetic group, pipelined function arithmetic units to be executed in pre-processing from the pipelined function arithmetic units 13-1 to 13-N in the one-dimensional arithmetic unit 11. The main controller 5 further causes the function controller 12 to designate the execution order of the selected pipelined function arithmetic units. The main controller 5 causes the function controller 12 to select, as the second pipelined function arithmetic group, pipelined function arithmetic units to be executed in post-processing from the pipelined function arithmetic units 13-1 to 13-N in the one-dimensional arithmetic unit 11. The main controller 5 further causes the function controller 12 to designate the execution order of the selected pipelined function arithmetic units.

The function controller 12 cascade-connects the pipelined function arithmetic units of the first pipelined function arithmetic group in the one-dimensional arithmetic unit 11 in accordance with the execution order of the pipelined function arithmetic units designated by the main controller 5. The function controller 12 sequentially inputs affine transform results from the two-dimensional arithmetic unit 10 to the first pipelined function arithmetic group. The affine transform results input to the first pipelined function arithmetic group are sequentially processed by the cascade-connected pipelined function arithmetic units. For example, multiplication for increasing the brightness and subtraction for removing noise are performed as one-dimensional operation.

[FFT Processing]

Figure 7A:
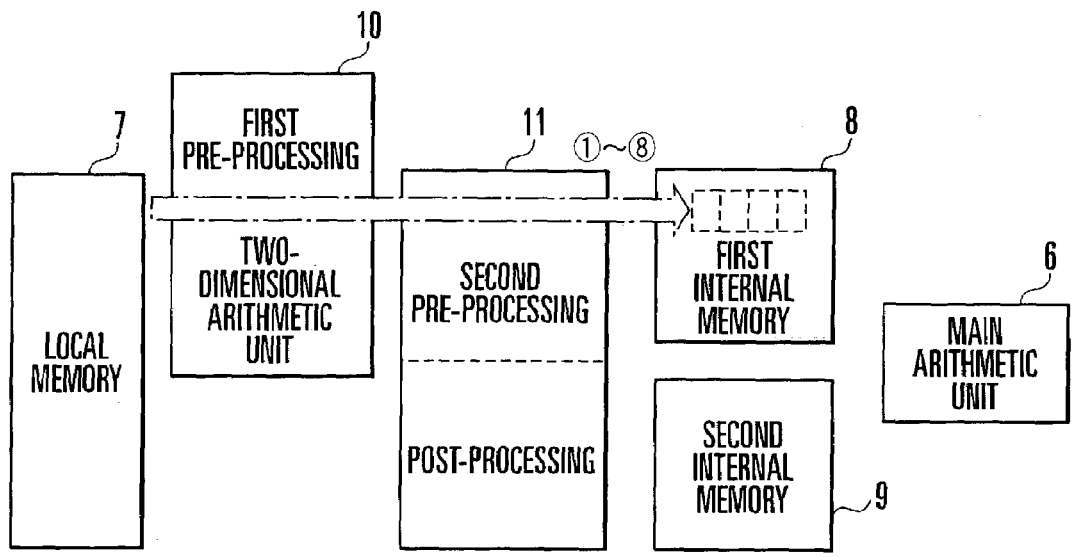
FIGS. 7A and 7B are block diagrams for explaining processing operation in the arithmetic processing apparatus.

Affine transform result ① from the two-dimensional arithmetic unit 10 is input to the one-dimensional arithmetic unit 11, and written as the first pre-processed data in the first internal memory 8. Similarly, affine transform results ② to ⑧ obtained by the two-dimensional arithmetic unit 10 are sequentially input to the one-dimensional arithmetic unit 11, and written as the second to eighth pre-processed data in the first internal memory 8 (see FIG. 7A).

After the eight pre-processed data are written in the first internal memory 8, the main arithmetic unit 6 sequentially reads out the pre-processed data from the first internal memory 8 in accordance with an instruction from the main controller 5. The main arithmetic unit 6 performs FFT processing for the readout pre-processed data, and writes FFT processing result data in the first internal memory 8 from which the data have been read out (see FIG. 7B).

Figure 7B:
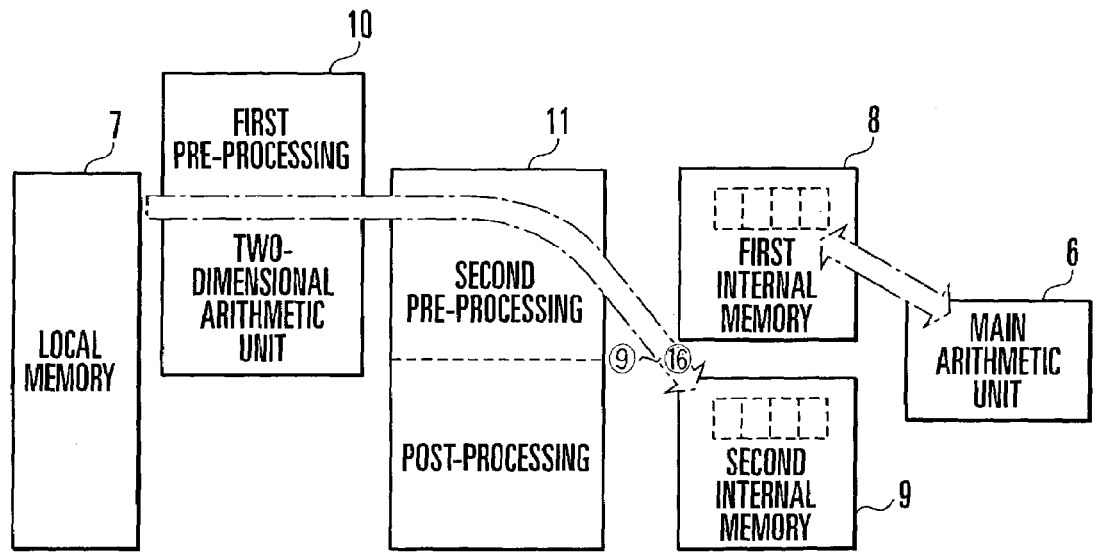

While the main arithmetic unit 6 performs FFT processing with the first internal memory 8, the function controller 12 writes arithmetic processing result data (ninth to 16th pre-processed data) in the second internal memory 9 from the two-dimensional arithmetic unit 10 via the one-dimensional arithmetic unit 11 (see FIG. 7B).

After FFT processing with the first internal memory 8 ends and eight pre-processed data are stored in the second internal memory 9, the main arithmetic unit 6 sequentially reads out the pre-processed data from the second internal memory 9 in accordance with an instruction from the main controller 5. The main arithmetic unit 6 performs FFT processing for the readout pre-processed data, and writes FFT processing result data in the second internal memory 9 from which the data have been read out (see FIG. 8A).

[Post-Processing]

While the main arithmetic unit 6 performs FFT processing with the second internal memory 9, the function controller 12 cascade-connects the pipelined function arithmetic units of the second pipelined function arithmetic group in the one-dimensional arithmetic unit 11 in accordance with the execution order designated by the main controller 5. The function controller 12 sequentially inputs FFT processing result data written in the first internal memory 8 to the second pipelined function arithmetic group. The FFT processing result data input to the second pipelined function arithmetic group are sequentially processed by the cascade-connected pipelined function arithmetic units, and written as post-processed data in the local memory 7 (see FIG. 8A). This post-processing includes, e.g., division for normalization.

After the post-processed data are written in the local memory 7, the function controller 12 cascade-connects the pipelined function arithmetic units of the first pipelined function arithmetic group in the one-dimensional arithmetic unit 11 in accordance with the execution order designated by the main controller 5. The function controller 12 sequentially inputs affine transform results from the two-dimensional arithmetic unit 10 to the first pipelined function arithmetic group. Also, the function controller 12 writes arithmetic processing result data (17th to 24th pre-processed data) obtained from the one-dimensional arithmetic unit 11 in the first internal memory 8 (see FIG. 8A).

After FFT processing with the second internal memory 9 ends and eight pre-processed data are stored in the first internal memory 8, the main arithmetic unit 6 sequentially reads out the pre-processed data from the first internal memory 8 in accordance with an instruction from the main controller 5. The main arithmetic unit 6 performs FFT processing for the readout pre-processed data, and writes FFT processing results in the first internal memory 8 from which the data have been read out (see FIG. 8B).

While the main arithmetic unit 6 performs FFT processing with the first internal memory 8, the function controller 12 cascade-connects the pipelined function arithmetic units of the second pipelined function arithmetic group in the one-dimensional arithmetic unit 11 in accordance with the execution order designated by the main controller 5. The function controller 12 sequentially inputs FFT processing result data of the main arithmetic unit 6 which are written in the second internal memory 9 to the second pipelined function arithmetic group. The FFT processing result data input to the second pipelined function arithmetic group are sequentially processed by the cascade-connected pipelined function arithmetic units, and written as post-processed data in the local memory 7 (see FIG. 8B).

After the post-processed data are written in the local memory 7, the function controller 12 cascade-connects the pipelined function arithmetic units of the first pipelined function arithmetic group in the one-dimensional arithmetic unit 11 in accordance with the execution order designated by the main controller 5. The function controller 12 sequentially inputs affine transform results from the two-dimensional arithmetic unit 10 to the first pipelined function arithmetic group. Also, the function controller 12 writes arithmetic processing result data (25th to 32nd pre-processed data) obtained from the one-dimensional arithmetic unit 11 in the second internal memory 9 (see FIG. 8B).

Figure 8A:
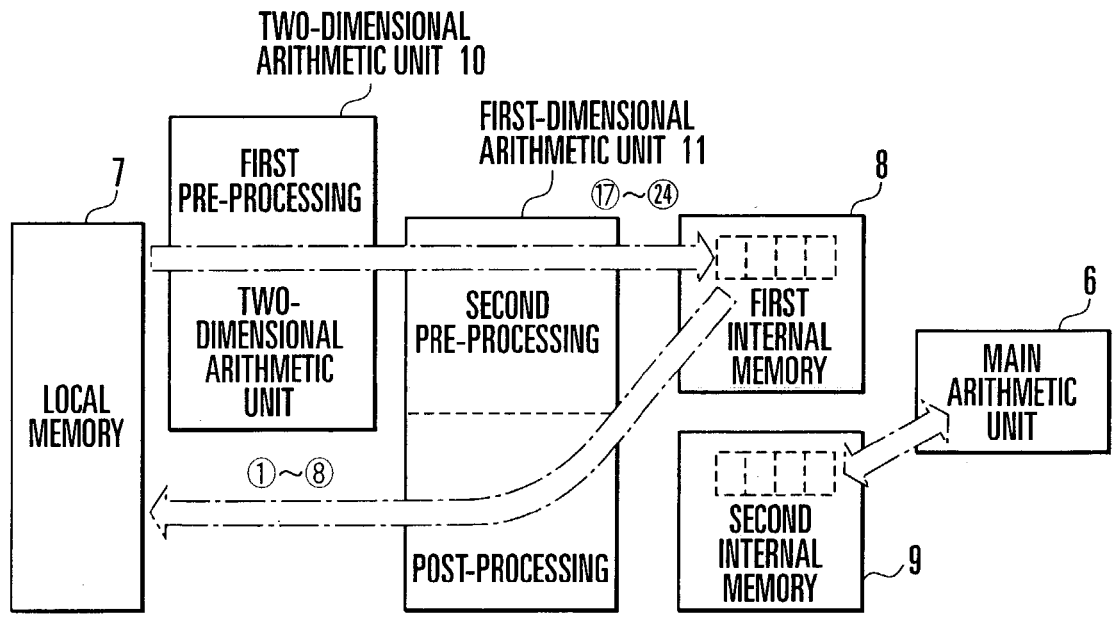
FIGS. 8A and 8B are block diagrams for explaining processing operation subsequent to FIGS. 7A and 7B in the arithmetic processing apparatus.
Figure 8B:
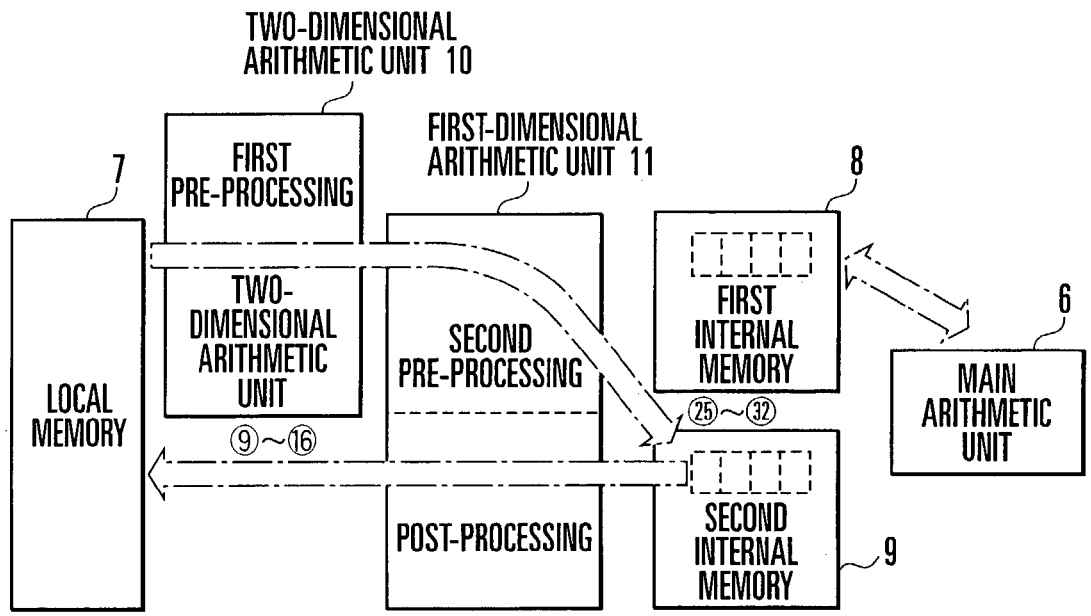
Figure 9:
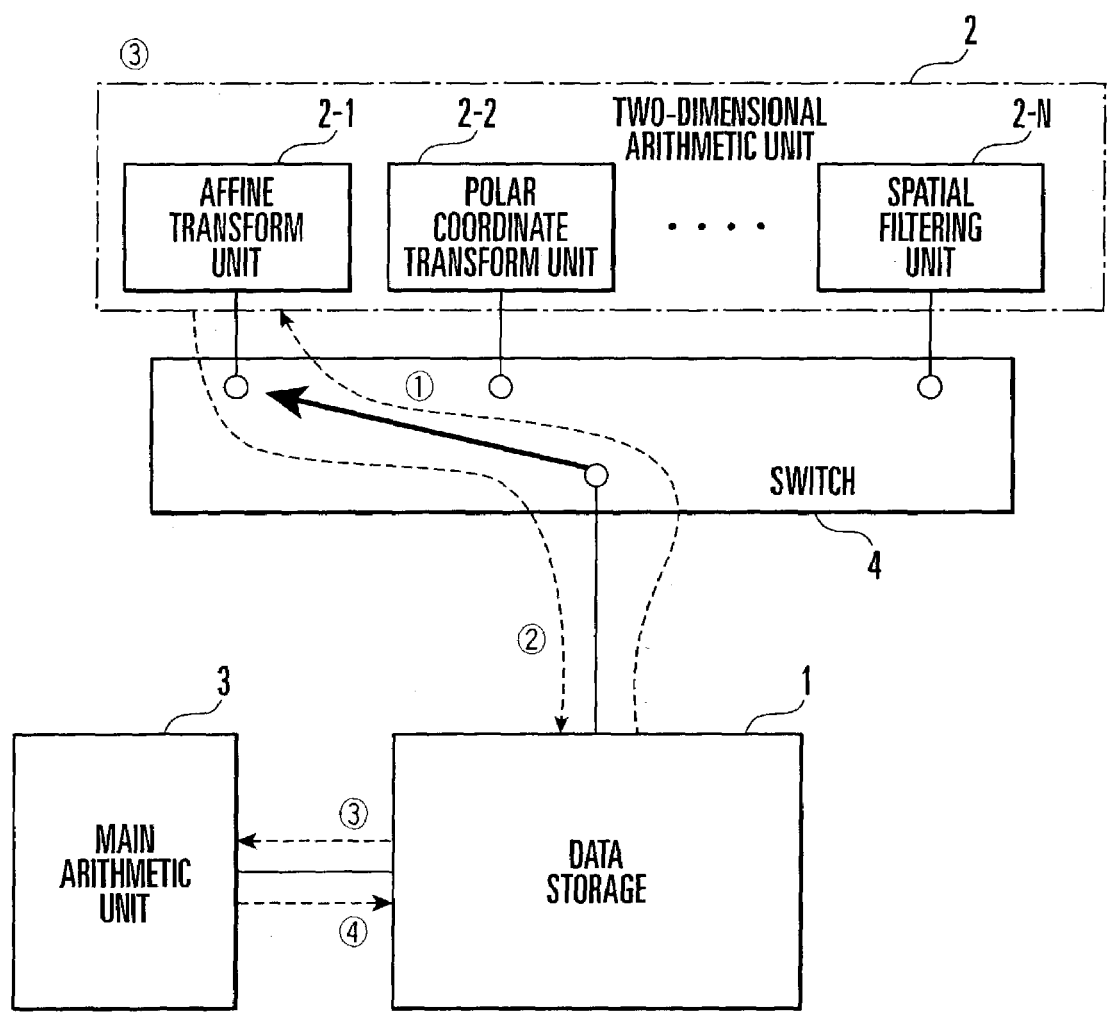
FIG. 9 is a block diagram showing the main part of a conventional arithmetic processing apparatus.

Similarly, processes in FIGS. 8A and 8B are alternately performed, and pre-processing using the two-dimensional arithmetic unit 10 and one-dimensional arithmetic unit 11, FFT processing using the main arithmetic unit 6, and post-processing using the one-dimensional arithmetic unit 11 are repeated. All data which are stored in the local memory 7 and subjected to processing undergo pre-processing (two-dimensional operation+one-dimensional operation)→FFT processing→post-processing (one-dimensional operation).

In this embodiment, as shown in FIG. 8A, write in the local memory 7 for data obtained by performing arithmetic processing (post-processing) by the one-dimensional arithmetic unit 11 for FFT processing result data of the main arithmetic unit 6 which are written in the first internal memory 8, and write in the first internal memory 8 for data (data having undergone the second pre-processing) obtained by performing arithmetic processing by the one-dimensional arithmetic unit 11 for affine transform results from the two-dimensional arithmetic unit 10 are executed in parallel to FFT processing between the main arithmetic unit 6 and the second internal memory 9.

Also, as shown in FIG. 8B, write in the local memory 7 for data obtained by performing arithmetic processing (post-processing) by the one-dimensional arithmetic unit 11 for FFT processing result data of the main arithmetic unit 6 which are written in the second internal memory 9, and write in the second internal memory 9 for data (data having undergone the second pre-processing) obtained by performing arithmetic processing by the one-dimensional arithmetic unit 11 for affine transform results from the two-dimensional arithmetic unit 10 are executed in parallel to FFT processing between the main arithmetic unit 6 and the first internal memory 8.

Letting Tpre be the pre-processing time (including two-dimensional operation, one-dimensional operation, and the data transfer time), Tpost be the post-processing time (including one-dimensional operation and the data transfer time), and Tmain be the FFT processing time, Tmain=Tpre+Tpost FFT processing is performed during pre-processing and post-processing, and the FFT processing time can be eliminated in appearance. To the contrary, pre-processing and post-processing are performed during FFT processing, and the time of pre-processing and post-processing can be eliminated in appearance. Hence, the time required for all arithmetic processes is shortened, greatly increasing the processing speed.

Note that these times need not always be set to

Tmain=Tpre+Tpost

Alternatively,

Tmain≧(Tpre+Tpost)

or

Tmain≦(Tpre+Tpost)

In short, it suffices to execute FFT processing and "pre-processing+post-processing" in parallel to each other. Parallel execution of FFT processing and "pre-processing+post-processing" can shorten the time required for all arithmetic processes. To compare the processing times of arithmetic processing apparatuses according to the present invention and prior art, Tmain (FFT processing)=1.573 msec Tpre (only affine transform)=3.437 msec were set. The total processing time was 5.015 msec (=Tmain+Tpre) in the prior art, and 3.437 msec (=Tpre) in the present invention. The present invention could eliminate the FFT processing time in appearance.

In this embodiment, data read and write seem to be frequently switched in the local memory 7. However, data read and write in the local memory 7 need not be switched in a short time by setting "data transfer time of pre-processing+data transfer time of post-processing"<main arithmetic time In this case, the local memory 7 can adopt a low-cost, large-capacity memory which generates a standby time in short-term switching between data read and write.

In this embodiment, the first internal memory 8 (second internal memory 9) requires a high-performance memory which hardly generates a standby time even if data read and write are switched within a short time for the purpose of FFT processing in the main arithmetic unit 6. Pre-processed data which are stored in the first and second internal memories 8 and 9 are subjected to FFT processing by the main arithmetic unit 6, and stored as FFT completion data in the first and second internal memories 8 and 9. These data are immediately read out by the function controller 12 and input to the one-dimensional arithmetic unit 11. Hence, the memory capacities of the first and second internal memories 8 and 9 suffice to be small.

In this embodiment, each of the pipelined function arithmetic units 13-1 to 13-N has one input and one output for descriptive convenience. Some functions (e.g., a function of calculating the difference between two images) may have two inputs and one output, three inputs and one output, and the like. In this case, only the first pipelined function arithmetic unit in each of the first and second pipelined function arithmetic groups is given a plurality of inputs and one output. For a plurality of inputs and one output, other inputs must be waited. An input standby time X is MAX (Xm) for a number m of inputs.

In this embodiment, the one-dimensional arithmetic unit 11 executes the second pre-processing and post-processing, but these processes are not indispensable. Basically, pre-processing (two-dimensional operation+one-dimensional operation)→FFT processing→post-processing (one-dimensional operation) are performed. This may be changed to pre-processing (two-dimensional operation+one-dimensional operation)→FFT processing. Alternatively, pre-processing (two-dimensional operation)→FFT processing→post-processing, or pre-processing (two-dimensional operation)→FFT processing may be adopted.

In this embodiment, the two-dimensional arithmetic unit 10 has a pipeline structure, but need not always have it. The pipeline structure allows the two-dimensional arithmetic unit 10 to start arithmetic processing of a new set of input data before the end of arithmetic processing of a preceding set of input data. New sets of input data can be sequentially input to the two-dimensional arithmetic unit 10 with a standby time much shorter than the processing time of the two-dimensional arithmetic unit 10. The processing time can be greatly shortened, compared to the absence of the pipeline structure.

In this embodiment, the present invention is applied to an image processing apparatus. The present invention is not limited to image processing, and can be applied to various arithmetic processes.

As has been described above, one two-dimensional arithmetic unit changes to various two-dimensional arithmetic units such as an affine transform unit, polar coordinate transform unit, and spatial filtering unit in accordance with designation of the type of operation and parameters from the main controller. The two-dimensional arithmetic unit includes an arrangement common to various two-dimensional operations and dedicated arrangements, enlarging the common part. The circuit scale can be reduced without decreasing the arithmetic processing speed, in comparison with an arrangement in which two-dimensional arithmetic units are arranged by necessary types of operations.

According to the present invention, write of arithmetic result data in the first data storage from the third data storage, and write of arithmetic result data in the third data storage from the first data storage via the two-dimensional arithmetic unit are performed in parallel to main operation between the main arithmetic unit and the second data storage. In addition, write of arithmetic result data in the first data storage from the second data storage, and write of arithmetic result data in the second data storage from the first data storage via the two-dimensional arithmetic unit are performed in parallel to main operation between the main arithmetic unit and the third data storage. The main arithmetic time can be eliminated in appearance, shortening the time required for all arithmetic processes.

What is claimed is:

1. An arithmetic processing apparatus comprising:
   first data storage means for storing data to be processed;
   two-dimensional arithmetic means for performing two-dimensional operation; and
   main control means for controlling said two-dimensional arithmetic means, wherein said two-dimensional arithmetic means comprises
   input address calculation means for calculating addresses of a set of input data necessary for a designated type of operation in said first data storage means in accordance with an execution start instruction which designates the type of operation and a parameter from said main control means, and
   arithmetic execution means for performing the designated type of operation for the set of input data which are stored at the calculated addresses in said first data storage means,
   second and third data storage means for storing data to be processed;
   main arithmetic means for performing, under control of said main control means, main operation for data which are read out from said second and third data storage means and subjected to processing, and writing operation data in said second and third data storage means from which the data have been read out; and
   function control means for writing, in said first data storage means, operation data written in said third data storage means in parallel to main operation performed between said main arithmetic means and said second data storage means, and writing, in said third data storage means, operation data output from said arithmetic execution means.

2. An apparatus according to claim 1, wherein said function control means writes, in said first data storage means, operation data of said main arithmetic means that is written in said second data storage means in parallel to main operation performed between said main arithmetic means and said third data storage means, and writes, in said second data storage means, operation data from said two-dimensional arithmetic means.

3. An apparatus according to claim 1, wherein said input address calculation means comprises
   a two-dimensional counter which increments a count value in synchronism with a clock signal,
   coordinate exchange means for exchanging coordinates,
   two-dimensional coordinate transform means for performing two-dimensional coordinate transform from coordinates of an output image into coordinates of an input image,
   neighboring pixel access means for accessing a neighboring pixel and obtaining coordinates of the pixel near the coordinates of the input image, and
   address transform means for transforming an address in two-dimensional expression that is output from said neighboring pixel access means into a one-dimensional address space.

4. An apparatus according to claim 1, wherein said arithmetic execution means comprises
   format conversion means for adjusting a bit width of an input signal,
   a multiplier which weights an output signal from said format conversion means, and
   an integrator which adds an output from said multiplier.

5. An apparatus according to claim 2, wherein
   the apparatus further comprises one-dimensional arithmetic means having at least one pipelined function arithmetic means for starting operation processing of new input data before end of operation processing of input data, and
   said function control means comprises
   function arithmetic means designation means for designating said pipelined function arithmetic means of a pipelined function arithmetic group in said one-dimensional arithmetic means that is selected by said main control means, and
   execution order designation means for cascade-connecting said pipelined function arithmetic means designated by said function arithmetic means designation means in accordance with an execution order, and transferring data processed by said pipelined function arithmetic means.

6. An apparatus according to claim 1, wherein said two-dimensional arithmetic means performs affine transform or polar coordinate transform.

7. An apparatus according to claim 1, wherein said main arithmetic means performs FFT processing.

* * * * *

UNITED STATES PATENT AND TRADEMARK OFFICE
CERTIFICATE OF CORRECTION

PATENT NO. : 7,191,201 B2 Page 1 of 1
APPLICATION NO. : 10/421125
DATED : March 13, 2007
INVENTOR(S) : Morikawa et al.

It is certified that error appears in the above-identified patent and that said Letters Patent is hereby corrected as shown below:

Title Page;
In Item [22], please delete "Aug. 4, 2003" and insert -- April 23, 2003 --.

Signed and Sealed this

Third Day of July, 2007

JON W. DUDAS
*Director of the United States Patent and Trademark Office*